US007235294B2

United States Patent
Story

(10) Patent No.: US 7,235,294 B2
(45) Date of Patent: Jun. 26, 2007

(54) COHESIVE COATING FOR SNACK FOOD PACKAGING

(75) Inventor: Harold G. Story, Milwaukee, WI (US)

(73) Assignee: Bostik, Inc., Wauwatosa, WI (US)

( * ) Notice: Subject to any disclaimer, the term of this patent is extended or adjusted under 35 U.S.C. 154(b) by 0 days.

(21) Appl. No.: 10/780,524

(22) Filed: Feb. 17, 2004

(65) Prior Publication Data

US 2005/0181205 A1 Aug. 18, 2005

(51) Int. Cl.
*B32B 7/12* (2006.01)
*C09J 7/02* (2006.01)

(52) U.S. Cl. .............. 428/356; 428/343; 428/355 AC; 428/492; 428/522; 428/349; 427/207.1

(58) Field of Classification Search ............... 428/343, 428/356, 355 AC, 492, 522, 349; 427/207.1
See application file for complete search history.

(56) References Cited

U.S. PATENT DOCUMENTS 4,804,573 A * 2/1989 McCarthy et al. .......... 428/201
6,099,682 A * 8/2000 Krampe et al. ............. 156/289
6,290,801 B1 * 9/2001 Krampe et al. ............. 156/289
6,436,499 B1 * 8/2002 Krampe et al. ............. 428/40.1
6,613,831 B1 * 9/2003 Bentley et al. ............. 524/501
2003/0113519 A1 * 6/2003 Wasserman et al. ........ 428/195

* cited by examiner

*Primary Examiner*—Daniel Zirker
(74) *Attorney, Agent, or Firm*—Andrus, Sceales, Starke & Sawall, LLP

(57) ABSTRACT

A water based, cold seal, cohesive coating for bonding one or more substrates together to form a flexible package to contain an article, especially useful for snack food packaging. The cohesive coating includes about 25% to about 90% by weight of a natural rubber latex emulsion, about 10% to about 75% by weight of a non-self-crosslinking acrylic emulsion, about 0.01% to about 10% by weight water, and one or more ingredient selected from an anti-foam agent, ammonia, a surfactant, an anti-blocking agent, an inert filler, and a conditioning agent, so that in combination the components total 100% by weight of the composition. The use of a non-self-crosslinking acrylic emulsion provides an improved cold seal cohesive that may be employed with current high temperature converting systems and provides improved adhesion to substrates, enhanced cohesion to itself, reduced blocking and avoids seal deadening.

78 Claims, 2 Drawing Sheets

COHESIVE COATING FOR SNACK FOOD PACKAGING

BACKGROUND OF THE INVENTION

The present invention relates to a water based, cold seal, cohesive coating for flexible packaging systems, and more particularly to a water based, cold seal, cohesive coating containing a non-self-crosslinking acrylic emulsion for use in food packaging and especially snack food packaging.

A cold seal adhesive, also referred to as a cohesive coating, is a type of pressure sensitive adhesive which possesses the ability to form a strong bond to itself when pressure is applied and also to form a bond with the flexible substrate on which it is applied. Cohesive coatings are thus pressure respondent, i.e. the introduction of mechanical energy is all that is required to initiate seal formation. Cold seal adhesives also preferably lack adhesion to the surfaces such as plastic films and overprint varnishes which are on the opposite face of these flexible substrates so that such flexible substrates or webs coated with the cold seal adhesive may be stored in roll form without blocking, i.e. without sticking together. Cohesive coatings are used in a variety of different types of applications, but are particularly desirable for use as sealants in packaging for snack food such as candies, chocolates, ice cream and the like which are sensitive to heat thus rendering undesirable the use of heat sealable adhesives to seal such packages.

Typical cold seal adhesives have been formulated by combining a natural rubber elastomer, particularly a latex, with other ingredients such as stabilizers, antioxidants, and the like. Natural rubber elastomers exhibit most of the desirable cold seal properties noted above. Typically, these natural rubber elastomers where blended together with an acrylic emulsion. The acrylic emulsion provides advantageous properties to the natural rubber latex to enable the latex to adequately bond to flexible packaging substrates that may be covered with various types of inks, primers, release modifiers, slip agents and the like. Unfortunately, acrylic emulsions used in the past had heat reactive sites in the polymer chain which allow crosslinking of the polymer at temperatures ranging from above about 127° C. (260° F.). Crosslinking results in an improvement of some physical properties and in better water and solvent resistance, but also makes the acrylic more brittle so that its adhesive properties are reduced. In the past, the heat reactive functionality of such acrylic emulsions was not important since there was no way for the crosslinking to be initiated, i.e. processing temperatures of the flexible packaging substrates were well below the critical temperature of 127° C. (260° F.), and there were no known chemical initiators in the packaging materials per se. Thus, the acrylic emulsion was adapted for use in cohesive or cold seal coatings for flexible food packaging systems.

In more recent years, however, new inks such as acrylic based and polyurethane based inks have been introduced for use on flexible packaging substrates. Also, the substrates themselves are typically laminations of various types of films bonded together with new laminating adhesives such as water based polyurethane dispersions (PUD's) and acrylics to form the substrate lamination. Further, the substrate itself is being manufactured from new films with multiple co-extrusion layers such as high barrier resins, high surface energy resins and low temperature sealing resins for the purpose of promoting adhesion of cold seal or cohesive coatings to the surface of the substrates. In addition, new processing equipment has been developed to speed the rate of converting raw materials to the flexible end product packaging assembly. New "extreme dryers" are being used to superheat and compress oven air that is used to dry flexible packaging coatings, and for example these extreme dryers run at 135° C. (275° F.) at 2.1 kg/cm² (30 psi). Unfortunately, running at such temperatures results in being 15 degrees higher than the critical temperature of 127° C. (260° F.) mentioned above for initiating crosslinking. As a result, the acrylic latex used in the past crosslinked with the result that although it became tougher, it also decreased its cohesiveness resulting in what is commonly referred to in the art as "seal deadening." Seal deadening of a flexible package results in failure of the seal which is unacceptable to manufacturers and consumers. As a result, it was desirable to develop a water based cohesive which could be utilized with flexible packaging systems that are manufactured by current techniques so that such systems do not result in cohesive failure.

SUMMARY OF THE INVENTION

The present invention provides a water based, cold seal, cohesive coating containing a natural rubber latex emulsion together with a non-self-crosslinking acrylic emulsion for flexible packaging systems, preferably food packaging systems, and most preferably snack food packaging systems. The cold seal cohesive coating is applied to selected areas of a substrate in the form of a flexible sheet of material, and provides satisfactory adhesion to the surface of the substrate and also provides the ability to form a strong bond to itself when pressure is applied to seal the package. The cold seal cohesive coating thus provides improved adhesion to meet the desired goal of providing at least 118.11 g/cm (300 g/inch) minimum bond strengths, offers enhanced cohesion to itself, offers resistance to seal deadening or degradation, and acceptable blocking strength so that it can be conveniently wound up on a reel for storage purposes.

In order to accomplish the above, the cold seal cohesive coating of the present invention is comprised of about 25% to about 90% by weight of a natural rubber latex emulsion, about 10% to about 75% by weight of a non-self-crosslinking acrylic emulsion, about 0.01% to about 10% by weight water, and one or more ingredients selected from an anti-foam agent, ammonia, a surfactant, an anti-blocking agent, an inert filler, and a conditioning agent, so that in combination the components total 100% by weight of the cohesive coating. Preferably, the cohesive coating of the present invention includes about 50% to about 90% by weight of the natural rubber latex emulsion and about 10% to about 50% by weight of the non-self-crosslinking acrylic emulsion in a blend with water and one or more of the other ingredients described above. In one particularly preferred composition the cohesive coating includes about 60% to about 80% by weight of the natural rubber latex emulsion, about 20% to about 40% by weight of the non-self-crosslinking acrylic emulsion, about 0.01% to about 5% by weight water, and about 0.01% to about 5% by weight of each of the anti-foam agent, ammonia, the surfactant, and the anti-blocking agent. Most preferably, the cohesive coating composition contains about 65% to about 70% by weight of the natural rubber latex emulsion, about 25% to about 35% by weight of the non-self-crosslinking acrylic emulsion, about 0.01% to about 3% by weight water, and about 0.01% to about 5% by weight of each of the anti-foam agent, the ammonia, the surfactant, and the anti-blocking agent.

The exact proportions of natural rubber latex emulsion and non-self-crosslinking acrylic emulsion are dependent on the commercial end use. For example, low pressure sealing which occurs at about 162.5 kpa (20 lbs./in.$^2$) would require a higher proportion of latex emulsion whereas higher pressure sealing as for example at about 650 kpa (80 lbs./in$^2$) would require a lower proportion of latex. The cold seal cohesive coating of the present invention may be advantageously applied to selected areas of the substrate by conventional means, e.g. gravure, reverse roll coating, flexo, Meyer rod or air knife coating. In addition, the cold seal cohesive coating of the present invention may then also be advantageously dried by conventional means, e.g. in an oven, at temperatures above 127° C. (260° F.), if desired, without detrimentally affecting the seals of the package.

In another aspect of the invention, there is provided a flexible packaging assembly for containing a food article. The flexible packaging assembly includes a substrate in the form of a flexible sheet of material having opposite longitudinal edges, and a water based, cold seal cohesive coating disposed on at least one of the longitudinal edges. The cohesive coating is comprised of the ingredients listed above.

In yet another aspect of the invention, the present invention provides a method for making a flexible package comprising the steps of applying a cold seal, cohesive coating containing the ingredients listed above to opposite longitudinal edges of a substrate in the form of a flexible sheet of material, contacting the cold seal cohesive coating applied along one longitudinal edge of the substrate with the cold seal cohesive coating applied on the opposite longitudinal edge of the substrate, and applying pressure to seal the cold seal cohesive coatings to one another and thus bond the two opposite longitudinal edges of the substrate together. The cold seal cohesive coating may also be applied transversely across the substrate so that when the longitudinal edges of the substrate are brought together, the coating at the end of each individual package is also brought together into intimate contact so that when pressure is applied, it will cause the cold seal cohesive coating to cohere and thus provide an end seal for the package.

It should also be noted that the method of forming a flexible package can also be utilized with two separate substrates. In such case, the cold seal cohesive coating applied to the longitudinal edges and the transverse ends of each substrate are brought into contact with each other so that when pressure is applied, the cold seal cohesive coatings on the two substrates are caused to cohere and thus bond the two substrates together to form a package.

DETAILED DESCRIPTION OF THE INVENTION

The present invention relates to a water based cold seal adhesive flexible packaging material which utilizes a cohesive coating containing natural latex and a non-self-crosslinking acrylic to provide a bond between one or more substrates when sealed. The packaging material can be utilized to wrap various types of products, such as food products like candy and other snack food to provide a flexible package to contain the product. Although food products are the preferred articles wrapped by the present cold seal adhesive system, the present disclosure is not limited to such packages, but instead may be utilized with other forms of packaging for containing both comestible as well as non-comestible products.

Figure 1:
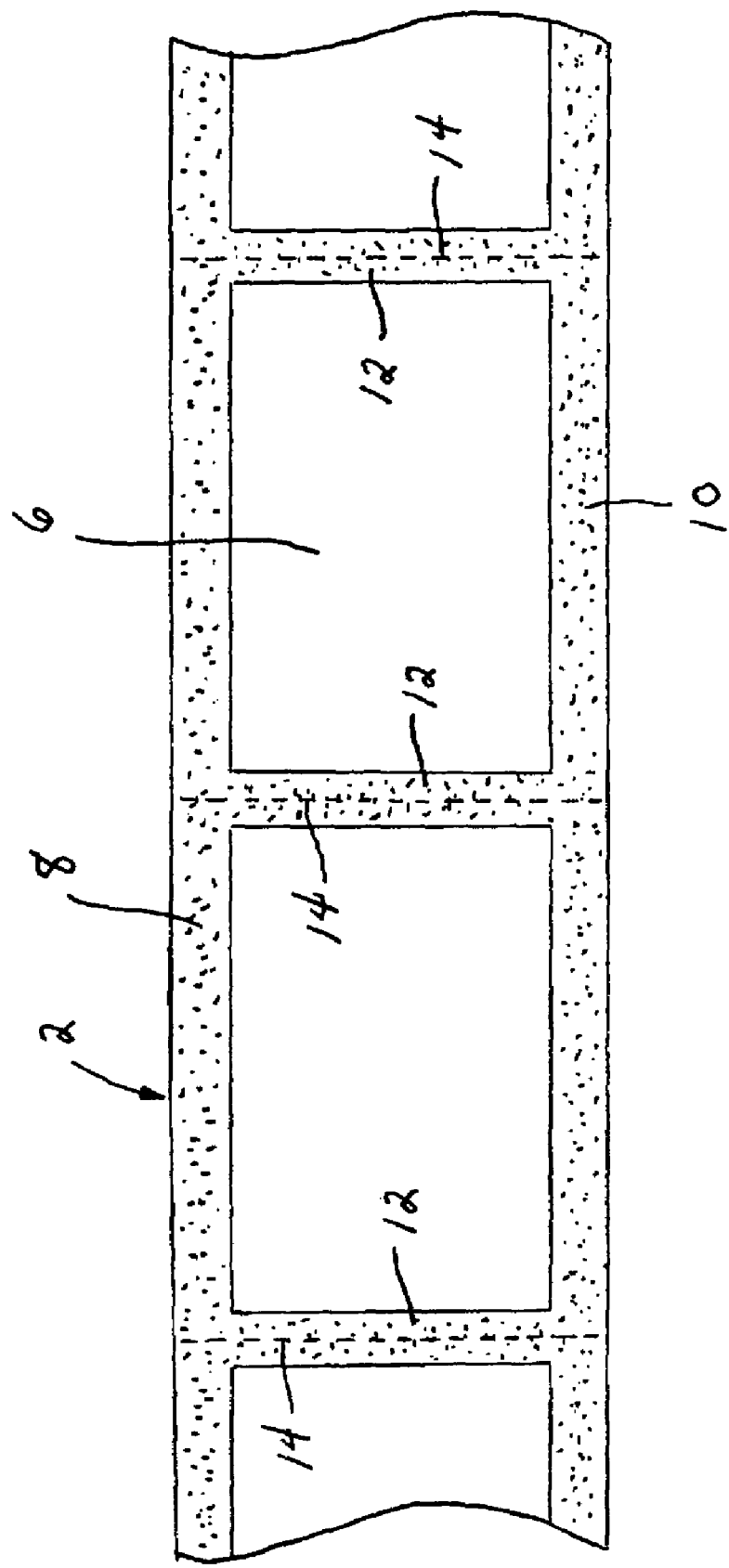
FIG. 1 is a plan view of an unassembled cold seal package utilizing a single flexible substrate and having the cohesive coating of the present invention applied thereon.
Figure 2:
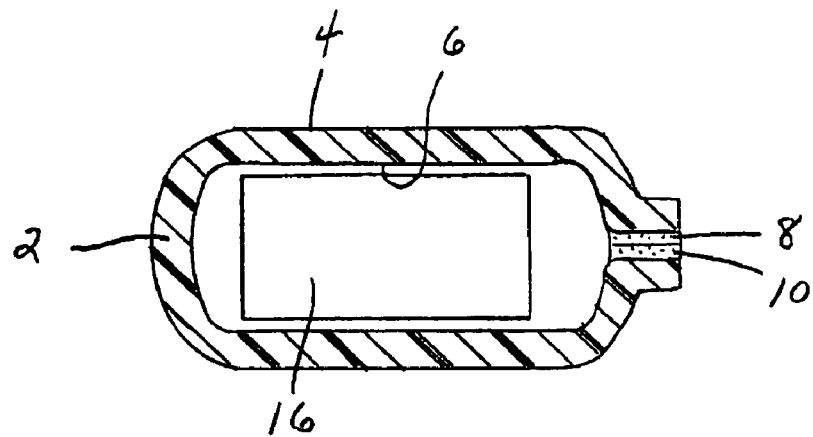
FIG. 2 is a cross-sectional view of the single flexible substrate of FIG. 1 formed into an assembled cold seal package in accordance with the present invention.

Referring to FIG. 1, the creation of a package typically begins with the production of a continuous sheet or web of wrapping material 2. The continuous web of material 2 is generally in the form of a thin, flexible film, and as is conventional, proceeds generally horizontally downstream to multi-station printing presses where artwork and text in one or more colors is applied to its exterior surface 4 (see FIG. 2), and adhesive in applied to its interior surface 6 in either a predetermined pattern or overall coverage. The adhesive pattern typically will be rectangular defined by a pair of longitudinal strips 8 and 10 along opposite edges of the web and a transverse strip 12 extending between the two longitudinal strips 8, 10. The distance between the transverse strips of adhesive define the length of the particular package, and is indicated by transverse dashed line 14. The adhesive layer is typically applied to the interior surface of the web after the application of the artwork and text on the exterior of the web by Gravure roll application, or by any other conventional means, so that the layer of adhesive has a thickness of about 0.05 to about 1.0 mil and may consist of either a multitude of separate spots or dots or a solid continuous layer. Also, it is typical for a protective surface, such as an overprint varnish or a release film, to be applied over the artwork and text to protect the artwork and text from smudging, and to control the coefficient of friction of the exterior surface of the web. As is conventional, the adhesive is applied in lengthwise and widthwise strips in appropriate selected surface areas of the web to form a rectangular configuration so that after insertion of the article 16 (FIG. 2) to be wrapped, the web 2 may be folded, as shown best in FIG. 2, so that the longitudinal and transverse strips 8, 10, 12 of adhesive register with one another and become aligned so that upon the application of pressure, the web 2 forms the shape, size and volume of the package desired.

As noted above, the web 2 itself is generally preferred to be formed as a thin, flexible material to function as a substrate for the materials to be applied. The web 2 itself may be made of a plastic film material such as polyethylene, polypropylene, polyester, polyolefins, polystyrene, nylon, polycarbonates, cellophane, ethylenevinyl acetates, ethylenevinyl alcohols, polyvinyl alcohols, polyvinyl chloride, alphaolefins, polyvinyl butyrate, cellulose acetate, butyrate or cellulose acetate propionate or metalized versions of any of the aforementioned films. Alternately, depending upon the article to be packaged, the web 2 may be made of a metalized foil such as aluminum foil, or the metalized foil may be laminated to the web. Another alternative, is for one or more webs to be formed of paper and paper products, including paperboard such as containerboard, which includes corrugating medium and linerboard used to make corrugated paper, and boxboard used to make folding cartons. In addition, paper products such as publication grade paper or bleached or unbleached kraft paper, or recycled paper may also be utilized. The above paper products may also be clay-coated to enhance printing of the artwork and text.

Figure 3:
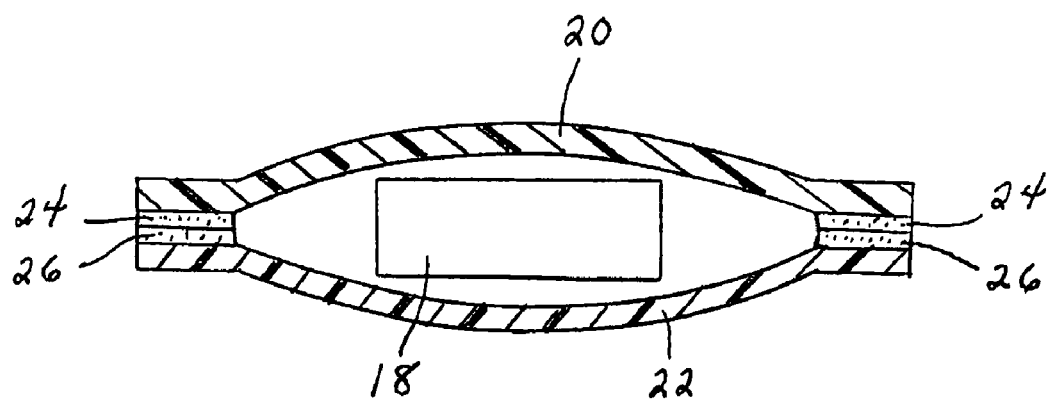
FIG. 3 is a cross-sectional view of an alternate embodiment of an assembled cold seal package utilizing two separate substrates.

In the packaging of food products, it is desirable to provide a peelable but non-resealable closure system (hereinafter referred to as a PNR system). In order to provide a peelable but non-resealable closure for the packaging material, the present invention provides a water based cold seal cohesive system containing natural rubber latex and a non-self-crosslinking acrylic. The system is comprised of a cohesive coating applied to one or more substrates or webs. Regardless of what is being packaged, it should be noted that in one form the packaging material may be comprised of a single substrate or web 2 and composed of the same substrate material. However, as shown best in FIG. 3, the packaging material may be separate substrates 20, 22 and each may be composed of a different material depending upon the particular packaging desired and article 18 to be wrapped, and each substrate 20, 22 may contain a cohesive coating 24, 26 respectively, as described above. In any event, the cohesive coatings 24 and 26 must have sufficient affinity for each other so that when a sealing pressure appropriate for the marketplace, typically 5 to 20 pounds per linear inch for low pressure packaging and 60 to 100 pounds per linear inch for confectionery, is applied thereto, the cohesive bonds to itself to form a closure for the packaging material and thus contain or wrap the article 18 inside.

However, for a PNR system, it is essential that the cohesive has more affinity for itself than it does for the substrate on which it is applied. It is also essential that the cohesive does not destroy, pull fibers, or if the web is laminated, de-laminate the web substrate when the package is opened. This necessarily implies that it is essential that the cohesive has more affinity for bonding to itself than the cohesive has for bonding to the substrate on which it is applied. This is typically measured by percent transfer of the cohesive when peeling in a T-peel configuration. The adhesive, when peeled, must not be resealable to the web or substrate from which it transferred.

Thus, the bond formed when the packaging material is closed must be stronger than the bond between the cohesive and the web resulting in the transfer of the cohesive when the substrates are peeled apart, i.e. the package is opened by a user, to thereby provide a non-resealable package.

In all PNR systems, the acceptable mode of failure is determined by the market in which the cold seal cohesive will be sold. Modes of failure include but are not restricted to, cohesive failure, cohesive split, adhesive failure, film or paper destruct, etc.

It is important to note that the cold seal cohesive utilized in the present system contains natural rubber. As used herein, the term "natural rubber" includes all materials made from or containing natural latex. The term "natural latex" as used herein is defined as a milky fluid that consists of extremely small particles of rubber obtained from plants, principally from the *H. brasiliensis* (rubber) tree dispersed in an aqueous medium. It contains a variety of naturally occurring substances, including cis-1,4-polyisoprene in a colloidal suspension and plant proteins.

The water based cold seal cohesive coating for bonding one or more substrates together to form a flexible package material to contain an article in accordance with the present invention comprises a cohesive coating containing the following components: about 25% to about 90% by weight of a natural rubber latex emulsion, about 10% to about 75% by weight of a non-self-crosslinking acrylic emulsion, about 0.01% to about 10% by weight water, and one or more ingredient selected from an anti-foam agent, ammonia, a surfactant, an anti-blocking agent, an inert filler, and a conditioning agent, so that in combination the components total 100% by weight of the cohesive coating. Preferably, the cohesive coating of the present invention includes about 50% to about 90% by weight of the natural rubber latex emulsion and about 10% to about 50% by weight of the non-self-crosslinking acrylic emulsion in a blend with water and one or more of the other ingredients described above. In one particularly preferred composition, the cohesive coating composition comprises about 60% to about 80% by weight of the natural rubber latex emulsion, about 20% to about 40% by weight of the non-self-crosslinking acrylic emulsion, about 0.01% to about 5% by weight water, about 0.01% to about 5% by weight of the anti-foam agent, about 0.01% to about 5% by weight of ammonia, about 0.01% to about 5% by weight of the surfactant, and about 0.01% to about 5% by weight of the anti-blocking agent. The most preferred composition for the cohesive coating comprises about 65% to about 70% by weight of the natural rubber latex emulsion, about 25% to about 35% by weight of the non-self-crosslinking acrylic emulsion, about 0.01% to about 3% by weight water, about 0.01% to about 1% by weight of the anti-foam agent, about 0.01% to about 1% by weight of ammonia, about 0.01% to about 1% by weight of the surfactant, and about 0.01% to about 1% by weight of the anti-blocking agent. It has been determined that one particularly desirable cohesive coating composition comprises about 68% by weight of the natural rubber latex emulsion, about 30% by weight of the non-self-crosslinking acrylic emulsion, about 1.2% by weight water, about 0.4% by weight of the anti-foam agent, about 0.2% by weight of ammonia, about 0.1% by weight of the surfactant, and about 0.1% by weight of the anti-blocking agent.

The natural rubber latex utilized in the composition of the present invention may be standard grade natural latex, high ammonia natural latex, low ammonia natural latex, double centrifuged latex, and/or high dry rubber content latex. The preferred natural rubber latex is of the high ammonia type. Typically, high ammonia natural latex is centrifuged natural latex preserved with ammonia only or by formaldehyde followed by ammonia. The ammonia (alkalinity) content of high ammonia latex is not less than 0.6% on latex percent, as per ISO-2004 ('88E) and ASTM D1076-88. Low ammonia latex is typically a centrifuged natural latex preserved with low ammonia and other preservatives. The ammonia content of low ammonia latex does not exceed 0.29% on latex percent as per the above cited ISO and ASTM Standards. Typically, low ammonia latex is preserved with 0.2% ammonia together with a suitable combination of zinc oxide (ZnO) and tetramethylthiuramdisulphide (TMTD) of not more than 0.1% in total, based on latex weight. Double centrifuged latex is a highly purified latex concentrate prepared by recentrifuging the first centrifuged latex which has been suitably diluted. As a result, the non-rubber constituents of latex are further reduced. High dry rubber content (65–67%) latex is prepared by centrifugation, and provides an alternative to the above latex emulsions because it dries faster.

A particularly preferred natural rubber latex for use in the present cohesive composition is a high ammonia natural rubber latex available under the trade designation "UNITEX" from Guthrie Latex, Inc. Another suitable high ammonia natural rubber latex emulsion is available under the trade designation Revertex from Centrotrade Rubber USA, Inc.

The cohesive composition of the present invention also includes a non-self-crosslinking acrylic emulsion. It is essential that the acrylic emulsion does not contain any self-crosslinking functionality. The acrylic emulsion may contain from about 45% to about 60% solids, with about 48% to about 56% solids preferred. The non-self-crosslinking acrylic emulsions may be selected from various types, such as styrene/acrylic, nitrile/acrylic and all-acrylic (i.e. 100% acrylic emulsion). Non-self-crosslinking emulsions are available under the trade designations Hycar 26548 (a styrene acrylic emulsion), Joncryl 77 (a styrene acrylic emulsion), or Eastarez 1040 (a styrene acrylic emulsion), from Noveon, Johnson Polymer, or Eastman Chemical Products, respectively, and may be employed herein. However, the preferred non-self-crosslinking acrylic emulsion is a styrene acrylic emulsion which contains from about 20% to about 40% styrene. The preferred styrene-acrylic emulsion is that available under the trade designation Eastarez 4000 available from Eastman Chemical Products. The use of a non-self-crosslinking acrylic emulsion provides water resistance, film clarity, alkali resistance, and pigment binding strength. In addition, since it contains no self-crosslinking functionalities, it can be used with the high temperature converting processes currently used in the industry and in particular above 127° C. (260° F.) without resulting in seal deadening of the packaged product.

The water utilized in the present cohesive composition may be local tap water, distilled water or deionized water. The only requirement is that the water utilized not contain any substantial degree of impurities and/or dissolved components that would not be compatible with the other formulating ingredients utilized in the present cohesive composition.

The ammonia which may be utilized in the cohesive composition is preferably in the form of ammonia hydroxide containing from about 20% to about 40% ammonia. However, the source of ammonia that can be utilized in the cohesive coating of the present invention may also be concentrated ammonia itself, or may be available as aqueous ammonia, ammonium hydroxide 29.4%, or ammonium hydroxide BE. Ammonia hydroxide available under the trade designation 26 DE from Hydrite Chemical Company has been found to be a preferred ingredient.

Anti-foam agents such as an emulsified silicone, a mineral oil based product and/or a glycol ester/polyol may be added to the cohesive coating to prevent foaming during application. Typical anti-foam agents include an emulsified silicone available under the trade designation Dow Antifoam AF from Dow Corning, a mineral oil based blend available under the trade designation Ultra Deefo 2001 from Ultra Additives, Inc. and a mineral oil available under the trade designation Rhodoline 675 from Rhodia, Inc. A particularly preferred anti-foam agent is a glycol ester/polyol available under the trade designation Rhodoline 999 from Rhodia, Inc.

Anti-blocking agents such as clays, calcium carbonate and/or fumed silica may be added to the cohesive coating to prevent blocking of the coating to the exterior side of the flexible material and which is not coated with the cohesive. These anti-blocking agents thus aid in preventing the cohesive coating from adhering to that exterior surface when the material is rolled up on a reel for storage. Typical anti-blocking agents include a clay available under the trade designation ASP600 from Fleming Co., a fumed silica available under the trade designation Lo-Vel 29 from PPG Industries, and a calcium carbonate available under the trade designation Atomite from Harry Holland. A particularly preferred anti-blocking agent is a fumed silica available under the trade designation Lo-Vel 29 available from PPG Industries.

The surfactant can be optionally present in the cohesive composition of the present invention in order to make the adhesive more hydrophilic. The surfactant has a hydrophile-lipophile balance (HLB) number of preferably less than 15. The HLB of a surfactant is an expression of its hydrophile-lipophile balance, i.e. the balance of the size and strength of the hydrophilic (water-loving or polar) and the lipophilic (oil-loving or non-polar) groups of the surfactant. All surfactants consist of a molecule that combines both hydrophilic and lipophilic groups.

The surfactant must be reasonably compatible with the other raw materials used in the cohesive so that it does not adversely affect the construction and performance of the adhesive. On the other hand, the surfactant must "bloom" to the surface of the adhesive so as to make the adhesive more hydrophilic. Thus, a delicate balance of compatibility must be maintained. The surfactant also must be sufficiently stable and non-volatile to allow processing in manufacturing and application equipment without effect on the cohesive.

As used herein, the term "surfactant" or "surface-active agent" refers to any compound that reduces surface tension when dissolved in water or water solutions, or which reduces interfacial tension between two liquids, or between a liquid and a solid. The surfactant may be selected from both nonionic and anionic types of surfactants. Examples of suitable surfactants include, but are not limited to, the following:

(1) Fatty acid esters such as glycerol esters, PEG esters, and sorbitan esters, including ethylene glycol distearate, ethylene glycol monostrearate, glycerol mono and/or dioleate, PEG dioleate, PEG monolaurate, sorbitan monolaurate, sorbitan trioleate, etc. These surfactants are available from ICI, Rhone-Poulenc, and other sources.

(2) Nonionic ethoxylates such as alkylphenol ethoxylates, alcohol ethoxylates, alkylamine ethoxylates, etc., including octylphenol ethoxylate, nonylphenol ethoxylate, alkylamine ethoxylates, etc. These surfactants are available from Rhone-Poulenc, Union Carbide, and other sources.

(3) Nonionic surfactants such as 2,4,7,9-tetramethyl-5-decyn-4,7-diol available from Air Products.

(4) Ethylene oxide/Propylene oxide copolymers which are available from Union Carbide, BASF, etc. It should be noted that these and other surfactants can be blended if necessary to produce the best blend of hydrophilic performance properties.

Aerosol MA80I is a sulfosuccinate anionic surfactant available from Cytec Industries which has been found to be a preferred surfactant for use in the present cohesive composition.

The cohesive composition useful in the present invention may be formulated using any of the techniques known in the art. A representative example of the prior art procedure involves placing the ingredients one by one into a stainless steel mixing vessel, while providing enough agitation to ensure proper and effective mixing of the ingredients. After all the ingredients have been added, the adhesive batch is adjusted to meet its critical physical parameters.

Optional conditioning additives may be incorporated into the cohesive composition in order to modify particular physical properties. These additives may include colorants, such as titanium dioxide, sequestrants, deionized water, preservatives, biocides, stabilizers, anti-cling agents, pH adjusters, and other commonly known and used additives. As noted above, each of such additives can be present in amounts ranging from 0% to about 5% by weight.

Fillers may also optionally be incorporated into the adhesive composition in amounts ranging from about 0% to 5% by weight, preferably 0% to 3% by weight. These are inert in the formulation, and are typically added to increase the bulk of the composition. Also, depending upon the substance employed, a filler may function as an anti-blocking agent. Fillers may include alumina, hydrated alumina ($Al_2O_3 \cdot 3H_2O$), a silicate such as magnesium silicate, aluminum silicate, sodium silicate, potassium silicate and the like, mica, calcium carbonate ($CaCO_3$) and silica. Other commonly employed fillers such as talc, clay, wollastonite, feldspar, glass microspheres, ceramic microspheres, thermoplastic microspheres, baryte and wood flour may also be used as long as they do not materially alter the function of the remaining ingredients in the formulation.

EXAMPLES

The following data was obtained by comparing bond strength performance using a self-crosslinking styrene/acrylic (Hycar 26288) to a non-self-crosslinking styrene/acrylic (Eastarez 4000) in cohesive formulations.

Test Method and Sample Preparation:

Test Equipment

Instron Model 1122 Material Tester with Model 5500 Electronics

Instron Test Equipment Setting—Crosshead Speed 30.5 cm/minute (12 inches/minute)

TMI Supersealer™—Sealing conditions 5.63 kg/cm² (80 psi/) 0.5 second dwell/serrated jaws.

Test Environment—Temperature 22.2° C. (72° F.)/Humidity 48%

Sample Size—2.54 cm by 10.16 cm (1 inch by 4 inches)

Cohesive Coat Weight—approximately 1.5 kg (3.3 lb)/ream

Cohesive samples for bond strength testing were prepared using a number 7-wire wound rod drawing down cohesive on 20.32 cm by 27.94 cm (8 inches by 11 inches) film substrate then dried at 82° C. (180° F.) for 30 seconds in a convection oven. Samples were then allowed to cool to ambient temperature. 2.54 cm by 10.16 cm (1 inch by 4 inch) samples were cut from lab draw down, sealed using TMI Supersealer™ then within 60 seconds of sealing tested for bond strength on the Instron Tester. Bond strength data was then recorded in grams/inch units.

In the following Examples, the abbreviation "NRL" refers to "natural rubber latex."

Example 1

Most preferred formula using non-self-crosslinking acrylics vs. standard cohesive formulations using self-crosslinking acrylics on polypropylene film. Results are an average of three data points.

| Cohesive Samples on OPP film | Minimum Bond Strength | Mode of Failure |
| --- | --- | --- |
| C2881 (most preferred formula) (69% NRL/31% Non-self-crosslinking acrylic) | 449 g | adhesive failure/non-resealable |
| C1099B (Standard w/self crosslinker) | 324 g | cohesive failure/resealable |
| C1380-01 (Standard w/self crosslinker) | 314 g | cohesive failure/resealable |

Example 2

Preferred formula range using non self-crosslinking acrylics vs. standard cohesive formulation using a self-crosslinking acrylic on primed polyester film. Results are an average of three data points.

| Cohesive Samples on primed PET film | Minimum Bond Strength | Mode of Failure |
| --- | --- | --- |
| C1772 (preferred range 75% NRL/25% Non self-crosslinking acrylic) | 686 g | adhesive failure/non-resealable |
| C2942 (preferred range 80% NRL/20% Non self-crosslinking acrylic | 915 g | adhesive failure/non-resealable |
| C1380-01 (Standard w/self crosslinker) | 180 g | cohesive failure/resealable |

Example 3

Preferred formula range using non self-crosslinking acrylics vs. standard cohesive formulation using a self-crosslinking acrylic on polyester film. Results are an average of three data points.

| Cohesive Samples on primed PET film | Minimum Bond Strength | Mode of Failure |
| --- | --- | --- |
| C1704 (preferred range 65% NRL/35% Non self-crosslinking acrylic | 547 g | adhesive failure/non-resealable |
| C1380-01 (Standard w/self crosslinker) | 455 g | cohesive failure/resealable |

Example 4

Preferred formula range using non self-crosslinking acrylics vs. standard cohesive formulation using a self-crosslinking acrylic on primed foil film. Results are an average of three data points.

| Cohesive Samples on primed PET film | Minimum Bond Strength | Mode of Failure |
| --- | --- | --- |
| C2942 (preferred range 80% NRL/20% Non self-crosslinking acrylic | 660 g | adhesive failure/non-resealable |
| C1099 (Standard w/self crosslinker) | 220 g | cohesive failure/resealable |

Example 5

Most preferred formulation using non self-crosslinking acrylics vs. standard cohesive formulation using a self-crosslinking acrylic on OPP film. Results are an average of three data points and are from a customer's test trial roll.

| Cohesive Samples on primed foil film | Minimum Bond Strength | Mode of Failure |
|---|---|---|
| C2881 (most preferred formula) (69% NRL/31% Non-self-crosslinking acrylic) | 371 g | adhesive failure/non-resealable |
| C1099 (Standard w/self crosslinker) | 217 g | cohesive failure/resealable |

In summary, it can be seen from the above data that in each case the use of a non-self-crosslinking acrylic resulted in higher bond strength than the use of a self-crosslinking acrylic.

I claim:

1. A water based cold seal cohesive coating for bonding one or more substrates together to form a flexible package to contain an article, said cohesive coating comprising the following components:
   about 25% to about 90% by weight of a natural rubber latex emulsion;
   about 10% to about 75% by weight of a non-self-crosslinking acrylic emulsion;
   about 0.01% to about 10% by weight water; and
   one or more ingredient selected from an anti-foam agent, ammonium hydroxide, a surfactant, an anti-blocking agent, an inert filler, and a conditioning agent;
   so that in combination the components total 100% by weight of said cohesive coating wherein the cohesive coating forms a peelable and non-resealable closure for a flexible package, said closure having a cohesive strength of at least about 300 g/inch after being dried on a substrate for said package at a temperature of at least about 260° F.

2. The cohesive coating of claim 1 wherein said anti-foam agent is selected from the group consisting of an emulsified silicone, a mineral oil based product and a glycol ester/polyol.

3. The cohesive coating of claim 1 wherein said anti-foam agent is a glycol ester/polyol.

4. The cohesive coating of claim 1 wherein said surfactant is selected from the group consisting of a fatty acid ester, a nonionic ethoxylate and an anionic sulfosuccinate.

5. The cohesive coating of claim 1 wherein said surfactant is an anionic sulfosuccinate.

6. The cohesive coating of claim 1 wherein said anti-blocking agent is selected from the group consisting of fumed silica, clay and calcium carbonate.

7. The cohesive coating of claim 1 wherein said anti-blocking agent is fumed silica.

8. The cohesive coating of claim 1 wherein said coating contains about 0.01% to about 5% by weight of the anti-foam agent.

9. The cohesive coating of claim 1 wherein said coating contains about 0.01% to about 5% by weight of ammonium hydroxide.

10. The cohesive coating of claim 1 wherein said coating contains about 0.01% to about 5% by weight of the surfactant.

11. The cohesive coating of claim 1 wherein said coating contains about 0.01% to about 5% by weight of the anti-blocking agent.

12. The cohesive coating of claim 1 wherein said non-self-crosslinking acrylic emulsion is selected from the group consisting of styrene acrylic, nitrile acrylic and all-acrylic.

13. The cohesive coating of claim 1 wherein said non-self-crosslinking acrylic emulsion is a styrene-acrylic emulsion.

14. A water based cold seal cohesive coating for bonding one or more substrates together to form a flexible package to contain an article, said cohesive coating comprising the following components:
   about 50% to about 90% by weight of a natural rubber latex emulsion;
   about 10% to about 50% by weight of a non-self-crosslinking acrylic emulsion;
   about 0.01% to about 10% by weight water; and
   one or more ingredient selected from an anti-foam agent, ammonium hydroxide, a surfactant, an anti-blocking agent, an inert filler, and a conditioning agent;
   so that in combination the components total 100% by weight of said cohesive coating wherein the cohesive coating forms a peelable and non-resealable closure for a flexible package, said closure having a cohesive strength of at least about 300 g/inch after being dried on a substrate for said package at a temperature of at least about 260° F.

15. The cohesive coating of claim 14 wherein said anti-foam agent is selected from the group consisting of an emulsified silicone, a mineral oil based product and a glycol ester/polyol.

16. The cohesive coating of claim 14 wherein said anti-foam agent is a glycol ester/polyol.

17. The cohesive coating of claim 14 wherein said surfactant is selected from the group consisting of a fatty acid ester, a nonionic ethoxylate and an anionic sulfosuccinate.

18. The cohesive coating of claim 14 wherein said surfactant is an anionic sulfosuccinate.

19. The cohesive coating of claim 14 wherein said anti-blocking agent is selected from the group consisting of fumed silica, clay and calcium carbonate.

20. The cohesive coating of claim 14 wherein said anti-blocking agent is fumed silica.

21. The cohesive coating of claim 14 wherein said coating contains about 0.01% to about 5% by weight of the anti-foam agent.

22. The cohesive coating of claim 14 wherein said coating contains about 0.01% to about 5% by weight of ammonium hydroxide.

23. The cohesive coating of claim 14 wherein said coating contains about 0.01% to about 5% by weight of the surfactant.

24. The cohesive coating of claim 14 wherein said coating contains about 0.01% to about 5% by weight of the anti-blocking agent.

25. The cohesive coating of claim 14 wherein said non-self-crosslinking acrylic emulsion is selected from the group consisting of styrene acrylic, nitrile acrylic and all-acrylic.

26. The cohesive coating of claim 14 wherein said non-self-crosslinking acrylic emulsion is a styrene-acrylic emulsion.

27. A water based cold seal cohesive coating for bonding one or more substrates together to form a flexible package to contain an article, said cohesive coating comprising the following components:
   about 60% to about 80% by weight of a natural rubber latex emulsion;
   about 20% to about 40% by weight of a non-self-crosslinking acrylic emulsion;
   about 0.01% to about 10% by weight water; and one or more ingredient selected from an anti-foam agent, ammonium hydroxide, a surfactant, an anti-blocking agent, an inert filler, and a conditioning agent;

so that in combination the components total 100% by weight of said cohesive coating wherein the cohesive coating forms a peelable and non-resealable closure for a flexible package, said closure having a cohesive strength of at least about 300 g/inch after being dried on a substrate for said package at a temperature of at least about 260° F.

28. The cohesive coating of claim 27 wherein said anti-foam agent is selected from the group consisting of an emulsified silicone, a mineral oil based product and a glycol ester/polyol.

29. The cohesive coating of claim 27 wherein said anti-foam agent is a glycol ester/polyol.

30. The cohesive coating of claim 27 wherein said surfactant is selected from the group consisting of a fatty acid ester, a nonionic ethoxylate and an anionic sulfosuccinate.

31. The cohesive coating of claim 27 wherein said surfactant is an anionic sulfosuccinate.

32. The cohesive coating of claim 27 wherein said anti-blocking agent is selected from the group consisting of fumed silica, clay and calcium carbonate.

33. The cohesive coating of claim 27 wherein said anti-blocking agent is fumed silica.

34. The cohesive coating of claim 27 wherein said coating contains about 0.01% to about 5% by weight of the anti-foam agent.

35. The cohesive coating of claim 27 wherein said coating contains about 0.01% to about 5% by weight of ammonium hydroxide.

36. The cohesive coating of claim 27 wherein said coating contains about 0.01% to about 5% by weight of the surfactant.

37. The cohesive coating of claim 27 wherein said coating contains about 0.01% to about 5% by weight of the anti-blocking agent.

38. The cohesive coating of claim 27 wherein said non-self-crosslinking acrylic emulsion is selected from the group consisting of styrene acrylic, nitrile acrylic and all-acrylic.

39. The cohesive coating of claim 27 wherein said non-self-crosslinking acrylic emulsion is a styrene-acrylic emulsion.

40. A water based cold seal cohesive coating for bonding one or more substrates together to form a flexible package to contain an article, said cohesive coating comprising the following components:
about 68% by weight of a natural rubber latex emulsion;
about 30% by weight of a non-self-crosslinking acrylic emulsion;
about 1.2% by weight water;
about 0.4% by weight of an anti-foam agent;
about 0.2% by weight of ammonium hydroxide;
about 0.1% by weight of a surfactant; and
about 0.1% by weight of an anti-blocking agent.

41. The cohesive coating of claim 40 wherein said anti-foam agent is selected from the group consisting of an emulsified silicone, a mineral oil based product and a glycol ester/polyol.

42. The cohesive coating of claim 40 wherein said anti-foam agent is a glycol ester/polyol.

43. The cohesive coating of claim 40 wherein said surfactant is selected from the group consisting of a fatty acid ester, a nonionic ethoxylate and an anionic sulfosuccinate.

44. The cohesive coating of claim 40 wherein said surfactant is an anionic sulfosuccinate.

45. The cohesive coating of claim 40 wherein said anti-blocking agent is selected from the group consisting of fumed silica, clay and calcium carbonate.

46. The cohesive coating of claim 40 wherein said anti-blocking agent is fumed silica.

47. The cohesive coating of claim 40 wherein said non-self-crosslinking acrylic emulsion is selected from the group consisting of styrene acrylic, nitrile acrylic and all-acrylic.

48. The cohesive coating of claim 40 wherein said non-self-crosslinking acrylic emulsion is a styrene-acrylic emulsion.

49. A flexible packaging material for containing a food article, comprising:
a substrate in the form of a flexible sheet of material having opposite longitudinal edges; and
a water based cold seal cohesive coating disposed on at least one of said longitudinal edges, said cohesive coating comprising the following components:
about 25% to about 90% by weight of a natural rubber latex emulsion;
about 10% to about 75% by weight of a non-self-crosslinking acrylic emulsion;
about 0.01% to about 10% by weight water; and
one or more ingredient selected from an anti-foam agent, ammonium hydroxide, a surfactant, an anti-blocking agent, an inert filler, a conditioning agent, and a stabilizer;
so that in combination the components total 100% by weight of said cohesive coating wherein the cohesive coating forms a peelable and non-resealable closure for a flexible package, said closure having a cohesive strength of at least about 300 g/inch after being dried on a substrate for said package at a temperature of at least about 260° F.

50. The flexible packaging material of claim 49 wherein said substrate is selected from the group consisting of a polyester film, a high density polyethylene film, a polypropylene film, a foil, a primed foil and a primed polyolefin film.

51. The flexible packaging material of claim 49 wherein said cohesive coating includes:
about 50% to about 90% by weight of the natural rubber latex emulsion; and
about 10% to about 50% by weight of the non-self-crosslinking acrylic emulsion.

52. The flexible packaging material of claim 49 wherein said cohesive coating includes:
about 60% to about 80% by weight of the natural rubber latex emulsion; and
about 20% to about 40% by weight of the non-self-crosslinking acrylic emulsion.

53. The flexible packaging material of claim 49 wherein said cohesive coating includes:
about 65% to about 70% by weight of the natural rubber latex emulsion; and
about 25% to about 35% by weight of the non-self-crosslinking acrylic emulsion.

54. The flexible packaging material of claim 49 wherein said cohesive coating comprises:
about 68% by weight of the natural rubber latex emulsion;
about 30% by weight of the non-self-crosslinking acrylic emulsion;
about 1.2% by weight water;
about 0.4% by weight of the anti-foam agent;
about 0.2% by weight of ammonium hydroxide;
about 0.1% by weight of the surfactant; and
about 0.1% by weight of the anti-blocking agent.

55. The flexible packaging material of claim 49 wherein said anti-foam agent is selected from the group consisting of an emulsified silicone, a mineral oil based product and a glycol ester/polyol.

56. The flexible packaging material of claim 49 wherein said anti-foam agent is a glycol ester/polyol.

57. The flexible packaging material of claim 49 wherein said surfactant is selected from the group consisting of a fatty acid ester, a nonionic ethoxylate and an anionic sulfosuccinate.

58. The flexible packaging material of claim 49 wherein said surfactant is an anionic sulfosuccinate.

59. The flexible packaging material of claim 49 wherein said anti-blocking agent is selected from the group consisting of fumed silica, clay and calcium carbonate.

60. The flexible packaging material of claim 49 wherein said anti-blocking agent is fumed silica.

61. The cohesive coating of claim 49 wherein said coating contains about 0.01% to about 5% by weight of the anti-foam agent.

62. The cohesive coating of claim 49 wherein said coating contains about 0.01% to about 5% by weight of ammonium hydroxide.

63. The cohesive coating of claim 49 wherein said coating contains about 0.01% to about 5% by weight of the surfactant.

64. The cohesive coating of claim 49 wherein said coating contains about 0.01% to about 5% by weight of the anti-blocking agent.

65. The flexible packaging material of claim 49 wherein said non-self-crosslinking acrylic emulsion is selected from the group consisting of styrene acrylic, nitrile acrylic and all-acrylic.

66. The flexible packaging material of claim 49 wherein said non-self-crosslinking acrylic emulsion is a styrene-acrylic emulsion.

67. A method of making a cold seal flexible package comprising the steps of:
applying a cold seal cohesive coating in accordance with claim 1 to selected areas of one side of a substrate in the form of a flexible sheet of material;
drying said cohesive coating at a temperature of at least about 260° F;
forming said substrate into a package; and
applying pressure to said selected areas to seal said package, said seal having a cohesive strength of at least about 300 g/inch.

68. The method of claim 67 wherein the step of forming said substrate into a package comprises folding said substrate so that the cohesive coating on different portions of said selected areas of said substrate contact each other.

69. The method of claim 67 wherein the step of forming said substrate into a package comprises contacting different portions of said selected areas of the cohesive coating on said substrate with a separate substrate.

70. A method of making a cold seal flexible package comprising the steps of:
applying a cold seal cohesive coating in accordance with claim 14 to selected areas of one side of a substrate in the form of a flexible sheet of material;
drying said cohesive coating at a temperature of at least about 260° F;
forming said substrate into a package; and
applying pressure to said selected areas to seal said package, said seal having a cohesive strength of at least about 300 g/inch.

71. The cohesive coating of claim 70 wherein the step of forming said substrate into a package comprises folding said substrate so that the cohesive coating on different portions of said selected areas of said substrate contact each other.

72. The cohesive coating of claim 70 wherein the step of forming said substrate into a package comprises contacting different portions of said selected areas of the cohesive coating on said substrate with a separate substrate.

73. A method of making a cold seal flexible package comprising the steps of:
applying a cold seal cohesive coating in accordance with claim 27 to selected areas of one side of a substrate in the form of a flexible sheet of material;
drying said cohesive coating at a temperature of at least about 260° F;
forming said substrate into a package; and
applying pressure to said selected areas to seal said package, said seal having a cohesive strength of at least about 300 g/inch.

74. The method of claim 73 wherein the step of forming said substrate into a package comprises folding said substrate so that the cohesive coating on different portions of said selected areas of said substrate contact each other.

75. The method of claim 73 wherein the step of forming said substrate into a package comprises contacting different portions of said selected areas of the cohesive coating on said substrate with a separate substrate.

76. A method of making a cold seal flexible package comprising the steps of:
applying a cold seal cohesive coating in accordance with claim 40 to selected areas of one side of a substrate in the form of a flexible sheet of material;
drying said cohesive coating at a temperature of at least about 260° F.;
forming said substrate into a package; and
applying pressure to said selected areas to seal said package, said seal having a cohesive strength of at least about 300 g/inch.

77. The method of claim 76 wherein the step of forming said substrate into a package comprises folding said substrate so that the cohesive coating on different portions of said selected areas of said substrate contact each other.

78. The method of claim 76 wherein the step of forming said substrate into a package comprises contacting different portions of said selected areas of the cohesive coating on said substrate with a separate substrate.

* * * * *